US008876121B2

(12) United States Patent
Hu

(10) Patent No.: US 8,876,121 B2
(45) Date of Patent: Nov. 4, 2014

(54) QUICK-RELEASE BIT ADAPTER

(76) Inventor: Bobby Hu, Taichung (TW)

( * ) Notice: Subject to any disclaimer, the term of this patent is extended or adjusted under 35 U.S.C. 154(b) by 588 days.

(21) Appl. No.: 13/223,354

(22) Filed: Sep. 1, 2011

(65) Prior Publication Data

US 2012/0280461 A1 Nov. 8, 2012

(30) Foreign Application Priority Data

May 6, 2011 (TW) ............................ 100116019 A

(51) Int. Cl.
*B23B 31/06* (2006.01)
*B23B 31/107* (2006.01)
*B25B 23/00* (2006.01)

(52) U.S. Cl.
CPC .................................. *B25B 23/0035* (2013.01)
USPC ............. 279/79; 279/143; 279/155; 279/156; 81/177.85; 81/438

(58) Field of Classification Search
USPC ......... 279/78, 143–145, 155, 156; 81/177.85, 81/483, 438
IPC ........................................... B23B 31/06,31/107
See application file for complete search history.

(56) References Cited

U.S. PATENT DOCUMENTS

| | | | | |
|---|---|---|---|---|
| 4,781,085 | A * | 11/1988 | Fox, III | 81/177.85 |
| 5,884,541 | A * | 3/1999 | Habermehl et al. | 81/438 |
| 5,934,384 | A * | 8/1999 | Wang | 173/132 |
| 6,062,112 | A * | 5/2000 | Bonniot | 81/177.85 |
| 6,199,457 | B1 * | 3/2001 | Hoff et al. | 81/177.85 |
| 6,554,292 | B1 * | 4/2003 | Rohm | 279/137 |
| 6,745,652 | B2 * | 6/2004 | Chen | 81/438 |
| 6,820,522 | B2 * | 11/2004 | Hu | 81/176.3 |
| 6,953,196 | B1 * | 10/2005 | Huang | 279/75 |
| 6,966,562 | B1 * | 11/2005 | Wienhold | 279/75 |
| 7,013,766 | B2 * | 3/2006 | Lee | 81/177.85 |
| 7,114,728 | B2 * | 10/2006 | Chen | 279/24 |
| 7,131,358 | B2 * | 11/2006 | Hsien | 81/438 |
| 7,237,990 | B2 * | 7/2007 | Deng | 409/175 |
| 7,306,396 | B1 * | 12/2007 | Chen | 403/327 |
| 7,448,302 | B2 * | 11/2008 | Huang | 81/438 |
| 7,823,890 | B2 * | 11/2010 | Chen | 279/143 |
| 8,172,236 | B2 * | 5/2012 | Shibata | 279/143 |
| 8,262,097 | B2 * | 9/2012 | Lai | 279/74 |
| 8,308,168 | B2 * | 11/2012 | Nash | 279/74 |
| 8,413,996 | B2 * | 4/2013 | Hu | 279/82 |
| 8,651,764 | B2 * | 2/2014 | Lin | 403/322.2 |
| 8,720,909 | B2 * | 5/2014 | Hu | 279/128 |
| 2006/0027057 | A1 * | 2/2006 | Hsien | 81/438 |
| 2008/0047403 | A1 * | 2/2008 | Lin | 81/177.85 |
| 2009/0085308 | A1 * | 4/2009 | Chiang | 279/102 |
| 2012/0104702 | A1 * | 5/2012 | Hu | 279/128 |

* cited by examiner

*Primary Examiner* — Eric A Gates
(74) *Attorney, Agent, or Firm* — Alan Kamrath; Kamrath IP Lawfirm, P.A.

(57) ABSTRACT

A quick-release bit adapter includes a body having a driving hole extending from a driving section towards a connecting section of the body. The driving section includes a sliding hole extending at a non-parallel angle to and in communication with the driving hole. A resilient positioning member is mounted in the driving section. A releasing device is slideably mounted in the sliding hole. When the releasing device is in a first position, the resilient positioning member is engaged in cuts in an outer periphery of a bit in an engagement position received in the driving hole. When the releasing device is moved to a second position, the bit is disengaged from the resilient positioning member to allow easy removal of the bit.

8 Claims, 9 Drawing Sheets

QUICK-RELEASE BIT ADAPTER

BACKGROUND OF THE INVENTION

The present invention relates to a bit adapter and, more particularly, to a quick-release bit adapter allowing quick release of a bit.

U.S. Pat. No. 5,934,384 discloses a transmission shaft and a bit mounting arrangement for a motor-driven hand drill. The transmission shaft includes a coupling hole in a front end thereof for coupling with a bit. A coupling rod extends from a rear end of the transmission shaft for engaging with a motor-driven hand drill. A chuck is mounted on the front end of the transmission shaft. A compression spring pushes a stop member to engage with cuts of the bit to fix the bit, preventing the bit from falling out of the coupling hole. Furthermore, a magnet is mounted in the coupling hole. The chuck is moved rearward to disengage from the bit when it is desired to remove the bit. In this case, the bit is still attracted by the magnet, preventing the bit from being disengaged from the coupling hole under the action of gravity.

However, the front end of the bit exposed outside of the coupling hole is relatively short, such that the user has to overcome the magnetic attraction of the magnet by tightly gripping the front end of the bit by the finger tips and forcibly moving the bit outward, which is laborsome. Furthermore, the front ends of the bits of different sizes differ from each other in size. Thus, it is difficult for the user to grip and apply force to the front ends of bits of small sizes due to small contact surfaces with the finger tips of the user, resulting in difficulties in removing the bit. Furthermore, the hand of the user is often stained with oil, leading to small friction between the finger tips of the user and the front end of the bit and causing difficulties in removing the bit. A pair of pliers has to be used to clamp and remove the bit, causing trouble to users frequently using the transmission shaft or to professional workers during replacement of bits. Furthermore, the chuck mounted around the front end of the transmission shaft increases the overall outer diameter of the transmission shaft, such that the transmission shaft can not reach small holes. In some cases, the chuck is impinged by an inner periphery of a small hole and loses its clamping function, resulting in hazards during working. Thus, the transmission shaft and the bit mounting arrangement are inconvenient and unsafe.

Thus, a need exists for a novel quick-release bit adapter allowing quick release of a bit while providing enhanced safety during use.

BRIEF SUMMARY OF THE INVENTION

The present invention solves this need and other problems in the field of convenient, quick, safe release of bits by providing a quick-release bit adapter that includes a body having a driving section on an end thereof and a connecting section on the other end thereof. The connection section is spaced from the driving section along a longitudinal axis. The driving section of the body is adapted to engage with a bit. The connecting section of the body is adapted to be rotated to drive the bit to rotate. The body includes a non-circular driving hole extending from the driving section towards the connecting section of the body along the longitudinal axis. The driving hole is adapted to removably receive the bit. The driving section of the body further includes an outer periphery having a sliding hole extending at a non-parallel angle to the longitudinal axis and in communication with the driving hole. A resilient positioning member is mounted in the driving section of the body and has at least one positioning section adapted to be releasably engaged in at least one of a plurality of cuts in an outer periphery of the bit when the bit is in an engagement position received in the driving hole. A releasing device is mounted in the sliding hole and slideable between first and second positions along the longitudinal axis.

When the releasing device is in the first position, the at least one positioning section of the resilient positioning member is engaged in at least one cut of the bit in the engagement position, retaining the bit in the engagement position in the driving hole of the body.

When the releasing device is moved from the first position to the second position, the bit is pushed outwards away from the driving hole of the body to a disengagement position to disengage the at least one positioning section of the resilient positioning device from the cuts of the bit, allowing easy removal of the bit from the driving hole of the body.

Preferably, the driving hole includes an inner periphery having six driving faces. Two adjacent driving faces are at 120° to each other and have a corner therebetween. An annular retaining groove is formed in the inner periphery of the driving hole and intersects the corners of the driving hole. The resilient positioning member includes at least one retaining section connected to the at least one positioning section and received in the retaining groove. When the releasing device is in the first position, the at least one positioning section of the resilient positioning member extends into at least one of the corners of the driving hole and is engaged in at least one of the cuts of the bit in the engagement position, retaining the bit in the engagement position in the driving hole of the body. When the releasing device is moved from the first position to the second position, the bit is pushed outward away from the driving hole of the body to the disengagement position to disengage the at least one positioning section of the resilient positioning device from the cuts of the bit. The at least one positioning section resiliently clamps at least one of six corners of the bit in the disengagement position, preventing the bit from falling out of the driving hole of the body under gravitational force. The bit in the disengagement position has an exposed length outside of the driving hole larger than the bit in the engagement position to allow easy removal of the bit from the driving hole.

Preferably, the resilient positioning member includes a retaining section and two positioning sections respectively connected to two ends of the retaining section, such that the resilient positioning member includes substantially C-shaped cross sections.

Preferably, two diagonally disposed corners of the driving hole have a first spacing therebetween. The retaining groove includes an annular bottom wall having an inner diameter larger than the first spacing. Inner sides of the two positioning sections of the resilient positioning member in a natural state extend into two of the corners of the driving hole. A second spacing between the inner sides of the two positioning sections is smaller than the first spacing. The two positioning sections are adapted to clamp the cuts in two diagonally disposed corners of the bit in the engagement position.

Preferably, the releasing device includes a control member extending through the sliding hole of the body. The control member has two control portions respectively formed on two ends of the control member and located outside of the sliding hole. The two control portions are adapted to be manually operated to slide the control member in the sliding hole of the body between the first and second positions.

Preferably, the outer periphery of the driving section of the body includes an outer diameter. The control portions of the control member do not extend beyond the outer diameter of the outer periphery of the driving section of the body.

Preferably, the outer periphery of the driving section of the body includes two recessed portions. The recessed portions receive the control portions of the control member, such that the control portions of the control member do not extend beyond the outer diameter of the outer periphery of the driving section of the body.

Preferably, the control member includes a cylindrical push portion extending through the sliding hole. The push portion has a diameter smaller than a diameter of the sliding hole. The push portion is slideable in the sliding hole between the first and second positions along the longitudinal axis of the body. The push portion is adapted to be manually operable to push the bit in the driving hole from the engagement position to the disengagement position. A tail end of the bit in the engagement position is adapted to abut a front side of the push portion, causing a rear side of the push portion to abut against a rear end wall of the sliding hole.

Preferably, the driving hole of the body includes an inner periphery having at least one protrusion located intermediate an outer end face of the driving section and the releasing device along the longitudinal axis of the body.

Preferably, the body includes six protrusions spaced at regular intervals and formed on the six corners of the driving hole. The six protrusions are adapted to abut six corners of the bit received in the driving hole.

Preferably, the body is substantially cylindrical, and the connecting section has hexagonal cross sections. The connecting section is adapted to be driven by a power tool to rotate.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
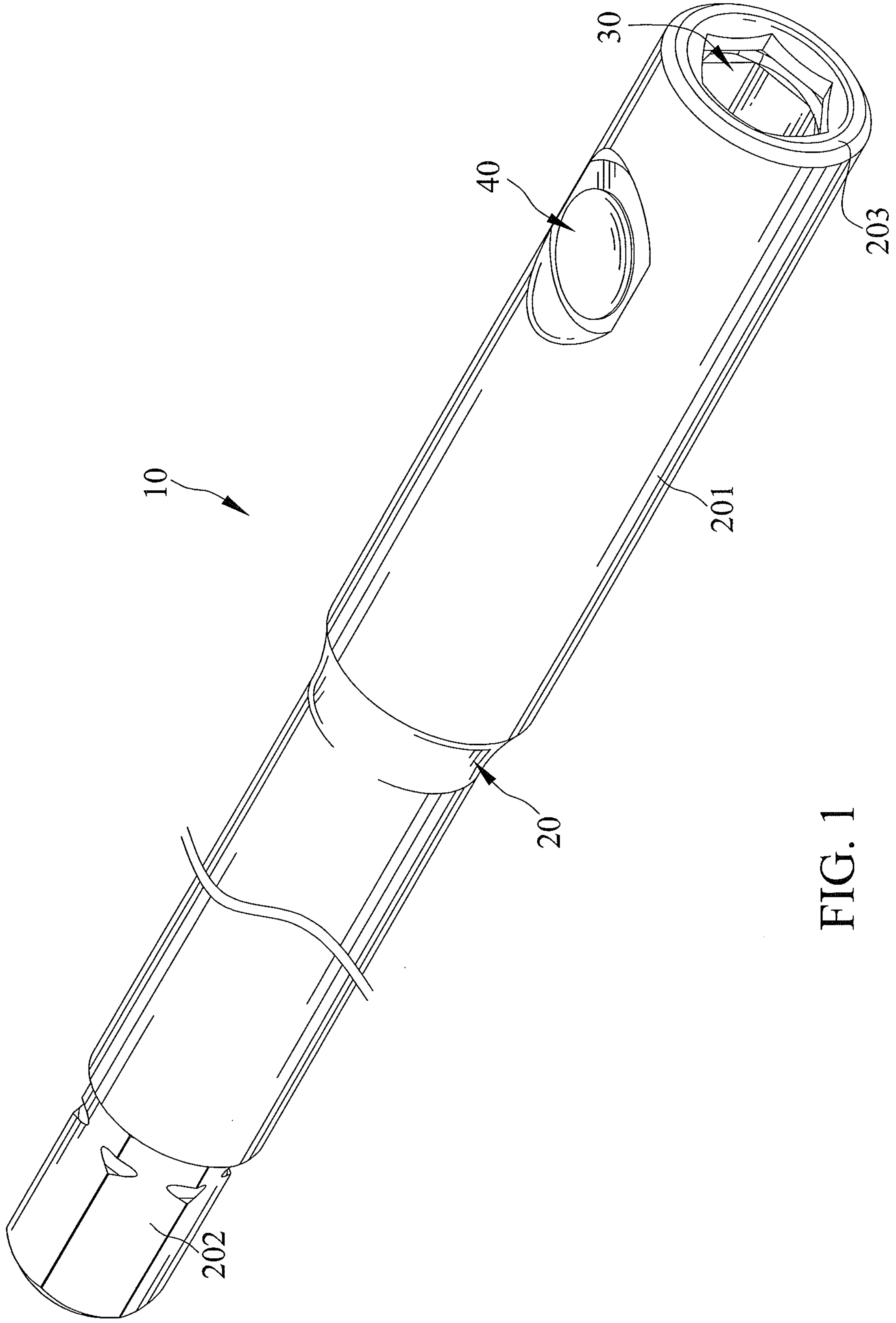
FIG. 1 shows a perspective view of a bit adapter according to the present invention.
Figure 2:
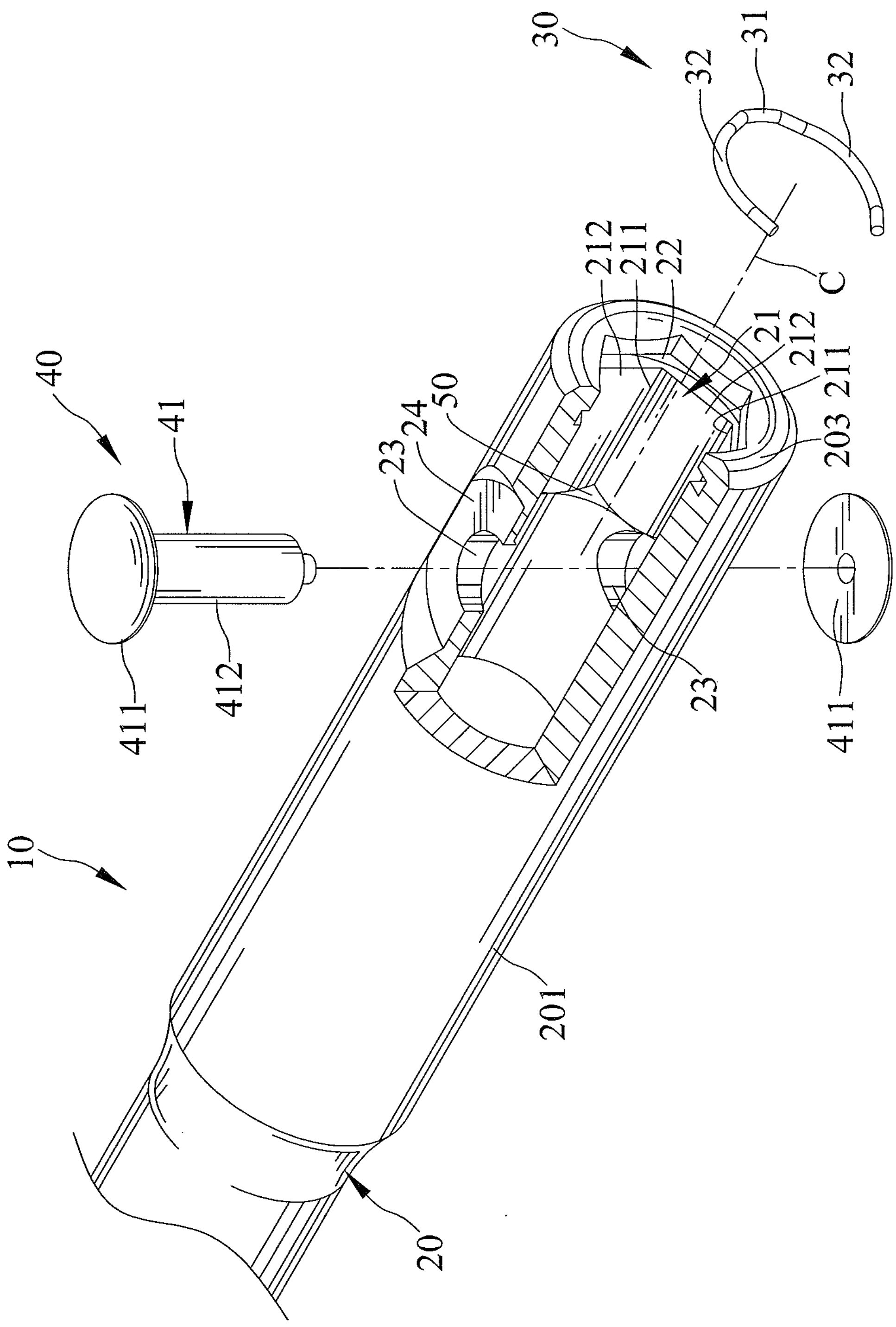
FIG. 2 shows a partial, exploded, perspective view of the bit adapter of FIG. 1 with portions broken away.
Figure 3:
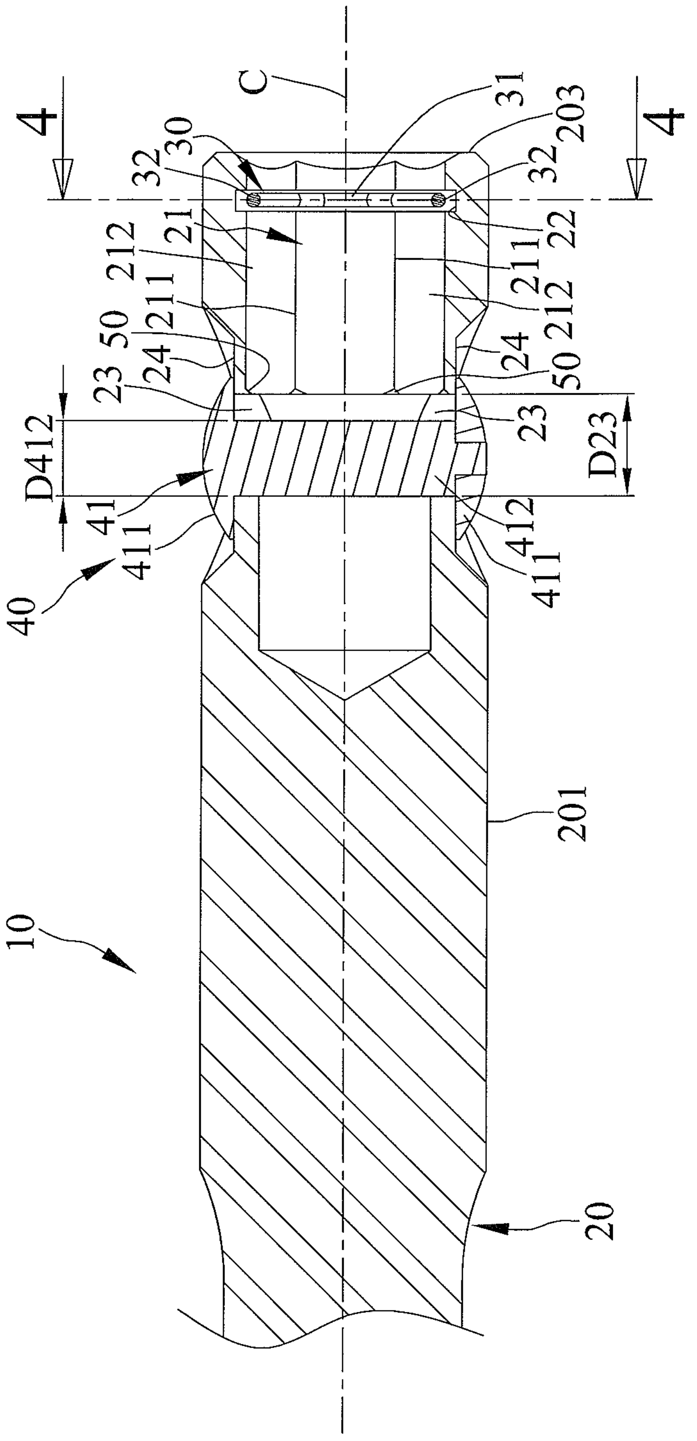
FIG. 3 shows a partial, cross sectional view of the bit adapter of FIG. 1.
Figure 4:
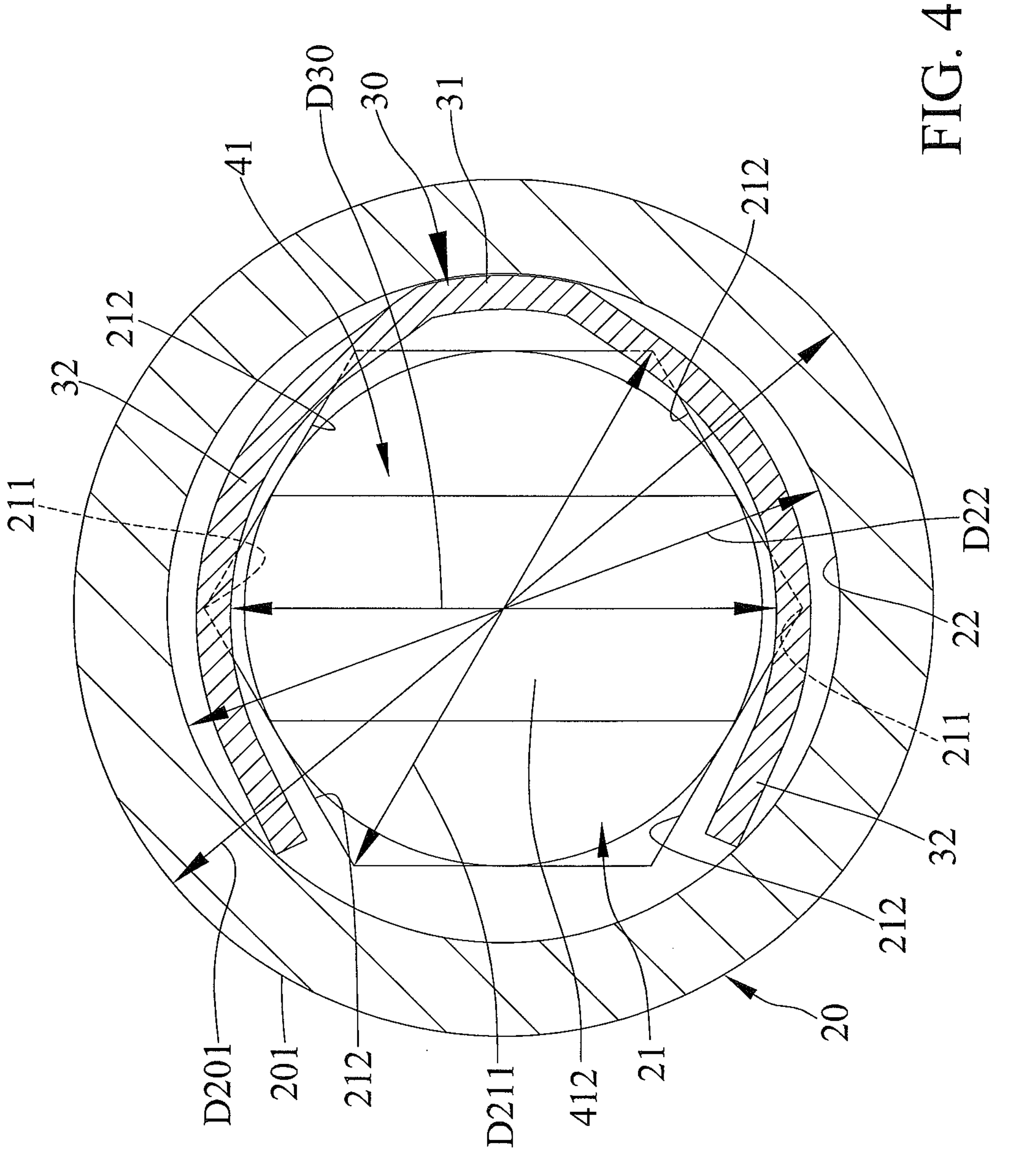
FIG. 4 shows a cross sectional view of the bit adapter of FIG. 1 according to section line 4-4 of FIG. 3.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “inner”, “outer”, “end”, “portion”, “longitudinal”, “inward”, “spacing”, “length”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

With reference to FIGS. 1-9, a quick-release bit adapter 10 according to the present invention includes a body 20 for engaging with a bit 90, a resilient positioning member 30 mounted in body 20 for retaining bit 90, and a releasing device 40 for releasing bit 90.

Body 20 is substantially cylindrical and includes a driving section 201 on an end thereof and a connecting section 202 on the other end thereof. Connection section 202 is spaced from driving section 201 along a longitudinal axis C. Driving section 201 of body 20 is adapted to engage with bit 90. Connecting section 202 of body 20 is adapted to be rotated by a rotational force to drive bit 90 to rotate.

Body 20 includes a non-circular driving hole 21 extending from driving section 201 towards connecting section 202 of body 20 along longitudinal axis C. Driving hole 21 is adapted to removably receive bit 90. In the form shown, driving hole 21 is hexagonal for receiving a hexagonal bit 90. Driving hole 21 includes an inner periphery having six driving faces 212. Two adjacent driving faces 212 are at 120° to each other and have a corner 211 therebetween. Bit 90 can be inserted into driving hole 21, such that six driving faces 212 are in contact with an outer periphery 91 of bit 90. When connecting section 202 and driving section 201 rotate, six driving faces 212 drive bit 90 to rotate. Connecting section 202 of body 20 includes hexagonal cross sections and can be driven by a power tool providing the rotational force.

An annular retaining groove 22 is formed in the inner periphery of driving hole 21 and intersects corners 211 of driving hole 21. Retaining groove 22 includes an annular bottom wall having an inner diameter D22. Two diagonally disposed corners 211 of driving hole 21 have a first spacing D211 smaller than inner diameter D22.

Driving section 201 of body 20 further includes an outer periphery having a sliding hole 23 extending at a non-parallel angle to and in communication with the driving hole 21. In the form shown, sliding hole 23 extends perpendicularly to longitudinal axis C.

Resilient positioning member 30 is mounted in driving section 201 of body 20 and has a section adapted to be releasably engaged in a plurality of cuts 93 in outer periphery 91 of bit 90 when bit 90 is in an engagement position received in the driving hole 21.

Resilient positioning member 30 includes at least one retaining section 31 and at least one positioning section 32 connected to an end of retaining section 31. Retaining section 31 is received in retaining groove 22 of driving section 201 of body 20 and retains bit 90 in driving section 201 without the risk of disengagement. The at least one positioning section 32 extends into at least one of six corners 211 of driving hole 21 and is engaged in at least one cut 93 of bit 90 to retain bit 90 in driving hole 21 of body 20.

In the form shown, resilient positioning member 30 includes a retaining section 31 and two positioning sections 32 respectively connected to two ends of the retaining section 31. Thus, resilient positioning member 30 includes substantially C-shaped cross sections.

When resilient positioning member 30 is in a natural state, inner sides of the two positioning sections 32 extend into two corners 211 of driving hole 21. The inner sides of the two positioning sections 32 have a second spacing D30 therebetween. Second spacing D30 is smaller than first spacing D211. Thus, the two positioning sections 32 of resilient positioning member 30 can be engaged in two cuts 93 at two diagonally disposed corners 92 of bit 90 to provide an excellent positioning effect.

Releasing device 40 is mounted in sliding hole 23 and slideable between first and second positions along longitudinal axis C for releasing bit 90. When releasing device 40 is in the first position, positioning sections 32 of resilient positioning member 30 is engaged in cuts 93 of bit 90 in the engagement position, retaining bit 90 in the engagement position in driving hole 21 of body 20. When releasing device 40 is moved from the first position to the second position, bit 90 is pushed outwards away from driving hole 21 of body 20 to a disengagement position to disengage from positioning sections 32 of resilient positioning device 30 from cuts 93 of bit 90, allowing easy removal of bit 90 from driving hole 21 of body 20.

In the form shown, when releasing device 40 is in the first position, positioning sections 32 of resilient positioning member 30 extend into corners 211 of driving hole 21 and are engaged in cuts 93 of bit 90 in the engagement position, retaining bit 90 in the engagement position in driving hole 21 of body 20. When releasing device 40 is moved from the first position to the second position, bit 90 is pushed outwards away from driving hole 21 of body 20 to the disengagement position to disengage positioning sections 32 of resilient positioning device 30 from cuts 93 of bit 90. Positioning sections resiliently clamp two diagonally disposed corners 92 of bit 90 in the disengagement position, preventing bit 90 from falling out of driving hole 21 of body 20 under gravitational force. Bit 90 in the disengagement position has an exposed length outside of driving hole 21 larger than bit 90 in the engagement position to allow easy removal of bit 90 from driving hole 21.

Releasing device 40 includes a control member 41 extending through sliding hole 23 of body 20. Control member 41 has two control portions 411 respectively formed on two ends of control member 41 and located outside of sliding hole 23. Control portions 411 are adapted to be manually operated to slide control member 41 in sliding hole 23 of body 20 between the first and second positions.

Control member 41 includes a cylindrical push portion 412 extending through sliding hole 23. Push portion 412 has a diameter D412 smaller than a diameter D23 of sliding hole 23. Push portion 412 is slideable in sliding hole 23 between the first and second positions along longitudinal axis C of body 20. Push portion 412 is manually operable to push bit 90 in driving hole 21 from the engagement position to the disengagement position.

Figure 5:
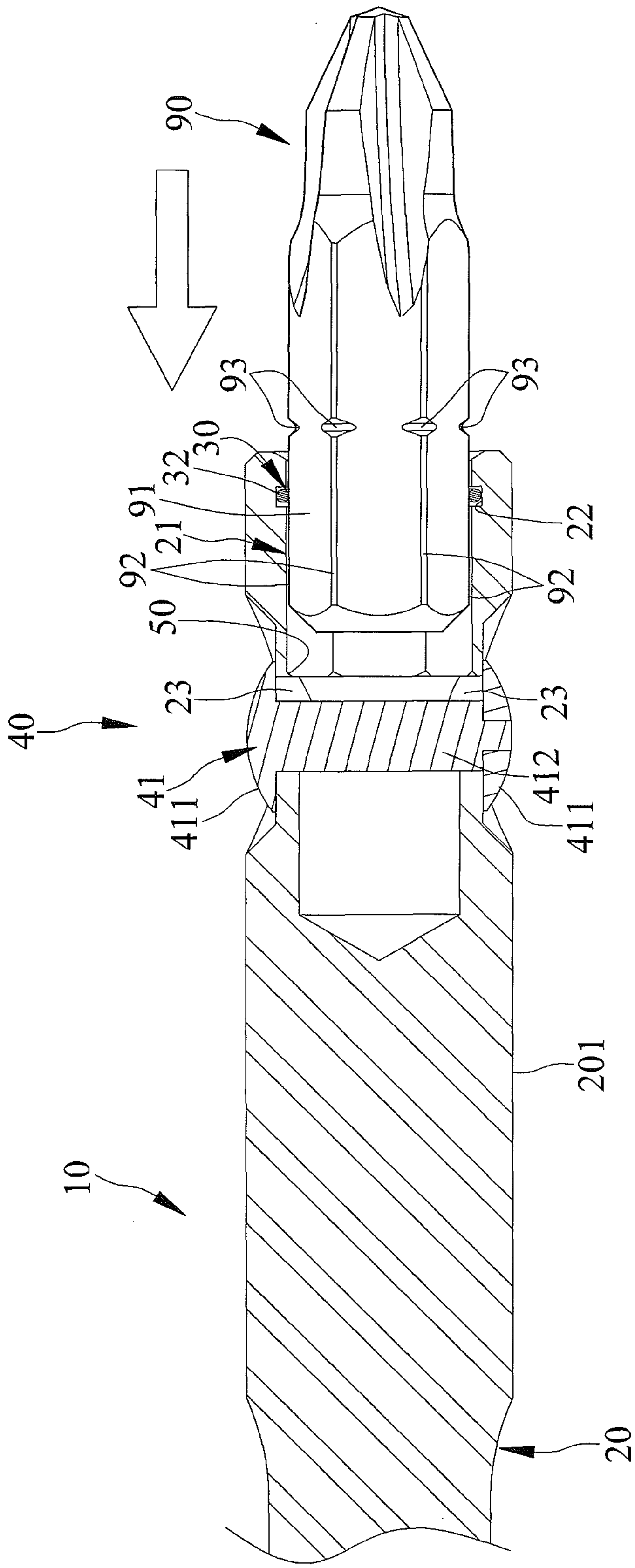
FIG. 5 shows a partial, cross sectional view of the bit adapter of FIG. 1 and a bit.

The outer periphery of driving section 201 of body 20 includes an outer diameter D201. Control portions 411 of control member 41 do not extend beyond outer diameter D201 of the outer periphery of driving section 201 of body 20 (FIG. 5). Thus, quick-release bit adapter 10 can extend into a small hole for rotational operation.

In the form shown, the outer periphery of driving section 201 of body 20 includes two recessed portions 24. Recessed portions 24 receive two control portions 411 of control member 41, such that control portions 411 of control member 41 do not extend beyond outer diameter D201 of the outer periphery of driving section 201 of body 20.

Driving hole 21 of body 20 includes at least one protrusion 50 extending from an inner periphery of driving hole 21 towards longitudinal axis C. When bit 90 is received in driving hole 21, bit 90 abuts and is stopped by protrusion 50, preventing bit 90 from entering too deep into body 20 by limiting the inserted extent of bit 90.

The at least one protrusion 50 is located intermediate an outer end face 203 of driving section 201 and releasing device 40 along longitudinal axis C of body 20. When bit 90 is stopped by the at least one protrusion 50, driving hole 21 receives a sufficient portion of the length of outer periphery 91 of bit 90 to provide high-torque transmission while bit 90 is driven by body 20 to rotate. In the form shown, body 20 includes six protrusions 50 in driving hole 21. Protrusions 50 are spaced at regular intervals and formed on the six corners of driving hole 21. Protrusions 50 are adapted to abut six corners 92 of bit 90 received in driving hole 21.

After bit 90 is inserted into driving hole 21 and located in the engagement position, a tail end of bit 90 abuts a front side of push portion 412 of releasing device 40, so that a rear side of push portion 412 abuts against a rear end wall of sliding hole 23. This achieves the same effect of protrusions 50 in limiting the inserted extent of the bit 90. However, driving hole 21 receives a sufficient portion of the length of outer periphery 91 of bit 90 to provide high-torque transmission while bit 90 is driven by body 20 to rotate.

Figure 6:
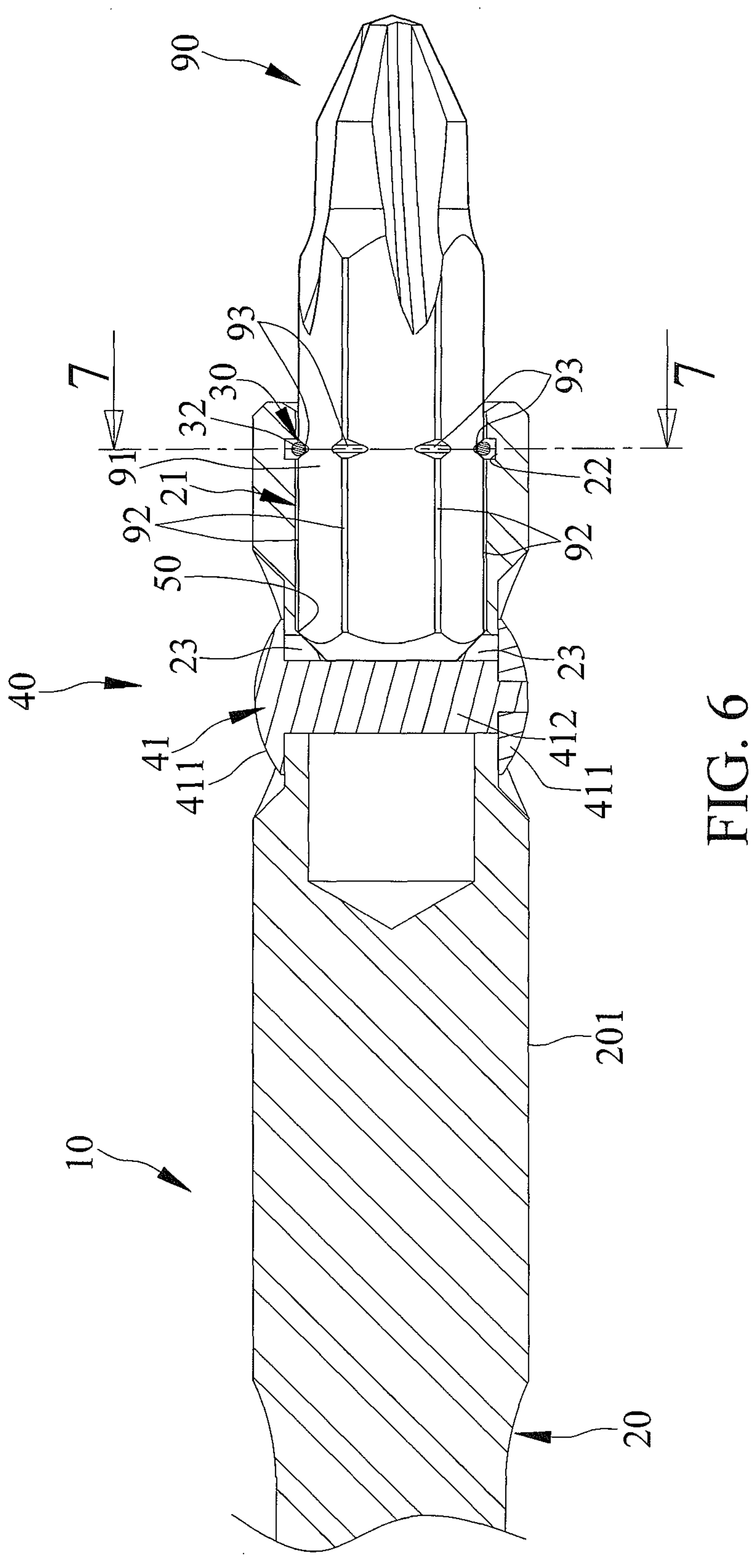
FIG. 6 is a view similar to FIG. 5, with a releasing device in a first position, and with the bit in an engagement position engaged with a resilient positioning member.
Figure 7:
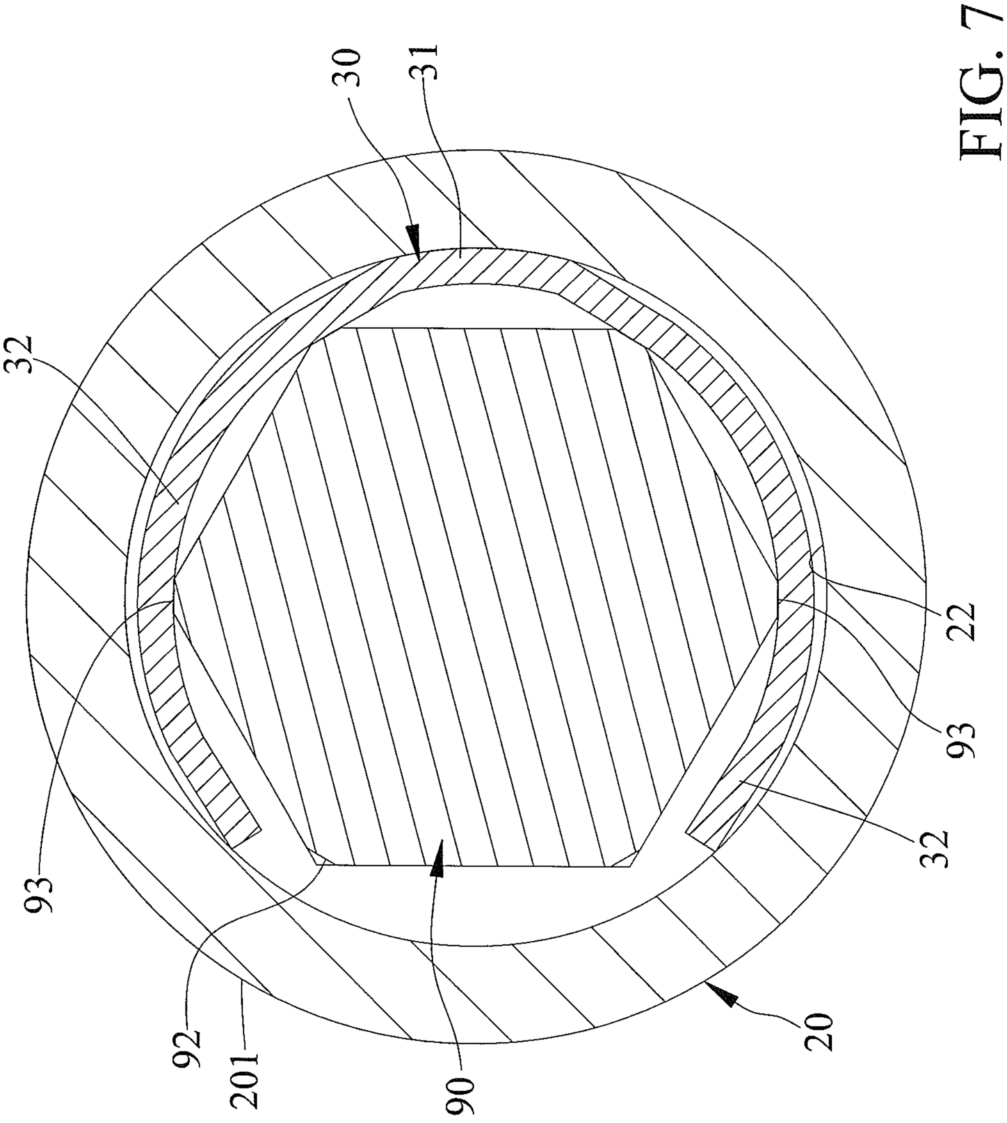
FIG. 7 shows a cross sectional view according to section line 7-7 of FIG. 6.

FIG. 5 illustrates engagement of quick-release adapter 10 with bit 90. Specifically, bit 90 is inserted into driving hole 21 and is moved towards connecting section 202. With reference to FIGS. 6 and 7, when bit 90 abuts and is stopped by protrusions 50, driving hole 21 receives a sufficient portion of the length of outer periphery 91 of bit 90 to provide high-torque transmission while bit 90 is driven to rotate by body 20. Specifically, the tail end of bit 90 abuts the front side of push portion 412 of releasing device 40, causing the rear side of push portion 412 to abut against the rear end wall of sliding hole 23. In this case, releasing device 40 is in the first position, and positioning sections 32 of resilient positioning member 30 are engaged in cuts 93 of bit 90 in the engagement position shown in FIG. 6. After firmly retaining bit 90 in driving hole 21, quick-release bit adapter 10 is ready for proceeding with rotational operation such as driving a screw or the like.

Figure 8:
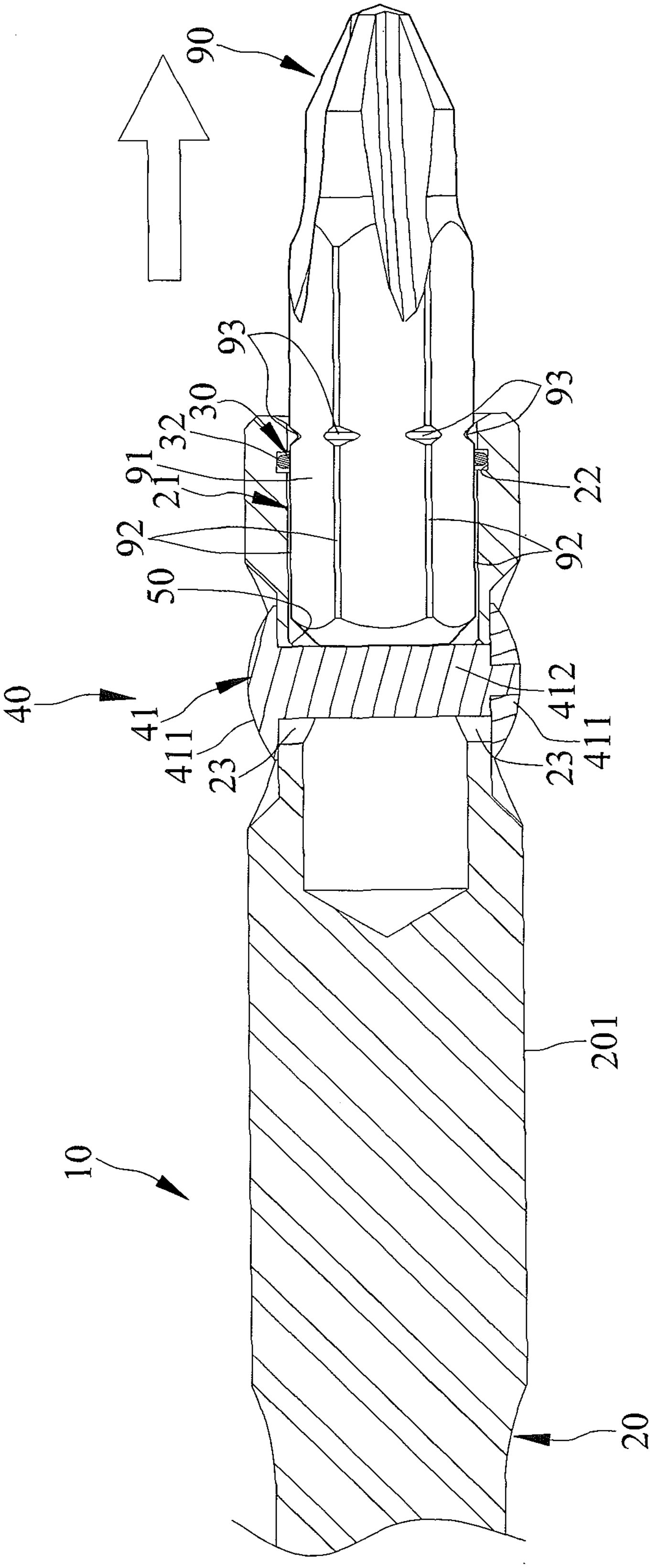
FIG. 8 shows a view similar to FIG. 6, with the releasing device moved to a second position, and with the bit disengaged from the resilient positioning member.
Figure 9:
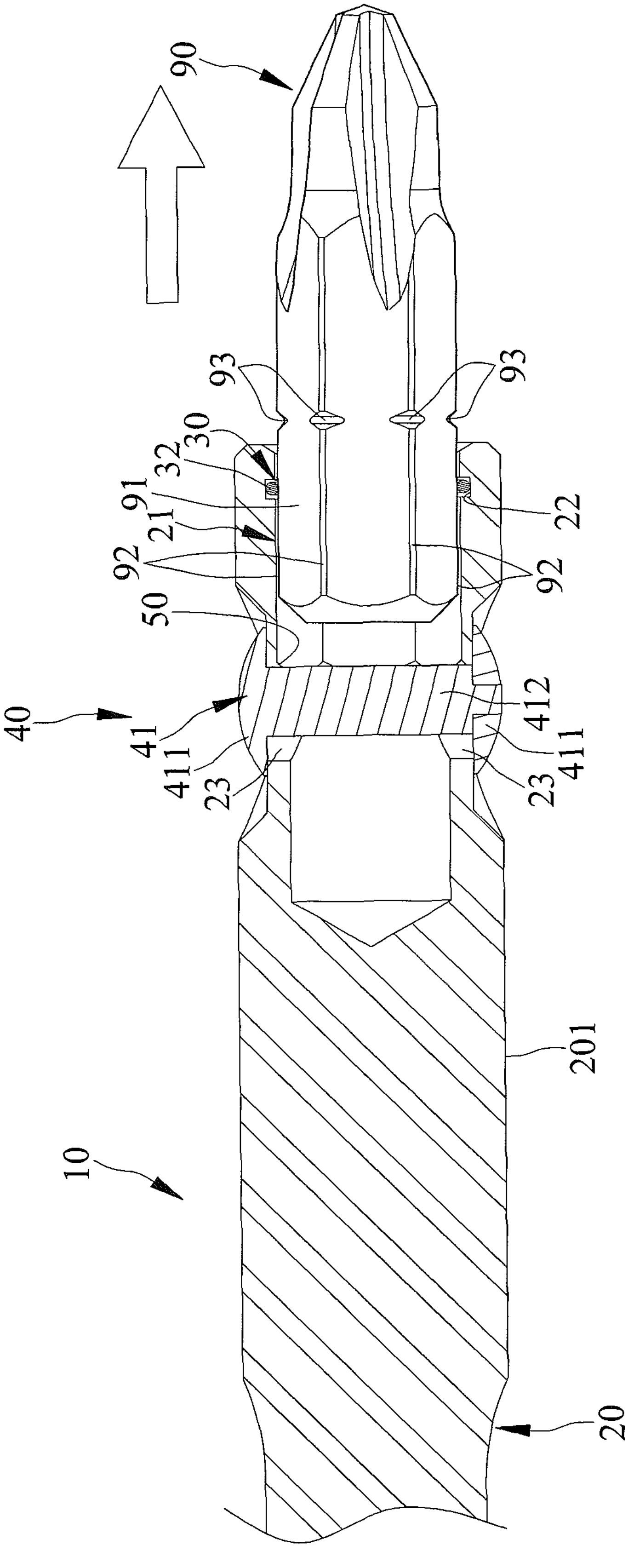
FIG. 9 is a view similar to FIG. 8, illustrating removal of the bit.

FIGS. 8 and 9 show removal of bit 90 from quick-release bit adapter 10. Specifically, control member 41 of releasing device 40 is manually moved from the first position to the second position. Bit 90 is moved outwards away from driving hole 21 to the disengagement position, such that positioning sections 32 disengage from cuts 93 of bit 90. Specifically, releasing device 40 moves bit 90 outwards away from driving hole 21 from the engagement position to the disengagement position, such that positioning sections 32 disengage from cuts 93 of bit 90 and resiliently clamp corners 92 of bit 90, preventing bit 90 from falling out of driving hole 21 of body 20 under gravitational force. Since bit 90 in the disengagement position has a spacing to driving section 201 larger than bit 90 in the engagement position, easy and rapid removal of bit 90 from driving hole 21 is provided.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A quick-release bit adapter comprising:

a body including a driving section on an end thereof and a connecting section on another end thereof, with the connecting section spaced from the driving section along a longitudinal axis, with the driving section of the body adapted to engage with a bit, with the connecting section of the body adapted to be rotated to drive the bit to rotate, with the body including a non-circular driving hole extending from the driving section towards the connecting section of the body along the longitudinal axis, with the driving hole adapted to removably receive the bit, with the driving section of the body further including an outer periphery having a sliding hole extending at a non-parallel angle to the longitudinal axis and in communication with the driving hole, with the outer periphery of the driving section of the body including an outer diameter, with the outer periphery of the driving section of the body including two recessed portions;

a resilient positioning member mounted in the driving section of the body, with the resilient positioning member having at least one positioning section adapted to be releasably engaged in at least one of a plurality of cuts in an outer periphery of the bit when the bit is in an engagement position received in the driving hole; and a releasing device mounted in the sliding hole and slideable between first and second positions along the longitudinal axis, with the releasing device including a control member extending through the sliding hole of the body, with the control member having two control portions respectively formed on two ends of the control member and located outside of the sliding hole, with the two control portions adapted to be manually operated to slide the control member in the sliding hole of the body between the first and second positions, with the two recessed portions receiving the two control portions of the control member with the two control portions of the control member not extending beyond the outer diameter of the outer periphery of the driving section of the body;

wherein when the releasing device is in the first position, said at least one positioning section of the resilient positioning member is engaged in at least one cut of the bit in the engagement position, retaining the bit in the engagement position in the driving hole of the body, and wherein when the releasing device is moved from the first position to the second position, the bit is pushed outwards away from the driving hole of the body to a disengagement position to disengage said at least one positioning section of the resilient positioning device from the plurality of cuts of the bit, allowing easy removal of the bit from the driving hole of the body.

2. The quick-release bit adapter as claimed in claim 1, with the driving hole including an inner periphery having six driving faces, with two adjacent driving faces being at 120° to each other and having a corner therebetween, with an annular retaining groove formed in the inner periphery of the driving hole and intersecting the corners of the driving hole, with the resilient positioning member including at least one retaining section connected to said at least one positioning section, with said at least one retaining section received in the retaining groove, wherein when the releasing device is in the first position, said at least one positioning section of the resilient positioning member extends into at least one of the corners of the driving hole and is engaged in the at least one of the cuts of the bit in the engagement position, retaining the bit in the engagement position in the driving hole of the body, and wherein when the releasing device is moved from the first position to the second position, the bit is pushed outward away from the driving hole of the body to the disengagement position to disengage said at least one positioning section of the resilient positioning device from the plurality of cuts of the bit, wherein said at least one positioning section resiliently clamps at least one of the corners of the bit in the disengagement position, preventing the bit from falling out of the driving hole of the body under gravitational force, with the bit in the disengagement position having an exposed length outside of the driving hole larger than the bit in the engagement position to allow easy removal of the bit from the driving hole.

3. The quick-release bit adapter as claimed in claim 2, with said at least one retaining section of the resilient positioning member including a retaining section, with said at least one positioning section of the resilient positioning member including two positioning sections respectively connected to two ends of the retaining section, with the resilient positioning member including substantially C-shaped cross sections.

4. The quick-release bit adapter as claimed in claim 3, with two diagonally disposed corners of the driving hole having a first spacing therebetween, with the retaining groove including an annular bottom wall having an inner diameter larger than the first spacing, with each of the two positioning sections having an inner side, with the inner sides of the two positioning sections of the resilient positioning member in a natural state extending into two of the corners of the driving hole, with the inner sides of the two positioning sections having a second spacing therebetween, with the second spacing smaller than the first spacing, with the two positioning sections adapted to clamp the cuts in the two diagonally disposed corners of the bit in the engagement position.

5. The quick-release bit adapter as claimed in claim 1, with the control member including a cylindrical push portion extending through the sliding hole, with the push portion having a diameter smaller than a diameter of the sliding hole, with the push portion slideable in the sliding hole between the first and second positions along the longitudinal axis of the body, with the push portion adapted to be manually operable to push the bit in the driving hole from the engagement position to the disengagement position, with the bit having a tail end, with the tail end of the bit in the engagement position adapted to abut a front side of the push portion, causing a rear side of the push portion to abut against a rear end wall of the sliding hole.

6. The quick-release bit adapter as claimed in claim 1, with the driving hole of the body including an inner periphery having at least one protrusion, with said at least one protrusion located intermediate an outer end face of the driving section and the releasing device along the longitudinal axis of the body.

7. The quick-release bit adapter as claimed in claim 6, with said at least one protrusion including six protrusions spaced at regular intervals and formed on six corners of the driving hole, with the six protrusions adapted to abut the six corners of the bit received in the driving hole.

8. The quick-release bit adapter as claimed in claim 1, with the body being substantially cylindrical, with the connecting section having hexagonal cross sections, with the connecting section adapted to be driven by a power tool to rotate.

* * * * *